(12) United States Patent
Ogawa

(10) Patent No.: US 6,958,962 B2
(45) Date of Patent: Oct. 25, 2005

(54) OPTICAL DISK DEVICE

(75) Inventor: Toshihiro Ogawa, Iruma (JP)

(73) Assignee: TEAC Corporation, Musashino (JP)

( * ) Notice: Subject to any disclaimer, the term of this patent is extended or adjusted under 35 U.S.C. 154(b) by 344 days.

(21) Appl. No.: 10/373,886

(22) Filed: Feb. 24, 2003

(65) Prior Publication Data
US 2003/0161237 A1 Aug. 28, 2003

(30) Foreign Application Priority Data
Feb. 25, 2002 (JP) .......................................... 2002-047516

(51) Int. Cl.$^7$ ........................................... G11B 7/125
(52) U.S. Cl. ................................ 369/47.53; 369/53.27; 369/116; 369/53.22
(58) Field of Search .................... 369/47.53, 53.27, 369/116, 53.1, 53.31, 53.22

(56) References Cited

U.S. PATENT DOCUMENTS

| | | | | |
|---|---|---|---|---|
| 6,028,834 A | * | 2/2000 | Kuroda et al. | 369/47.53 |
| 6,563,775 B2 | * | 5/2003 | Sato | 369/47.53 |
| 6,600,715 B2 | * | 7/2003 | Okumura et al. | 369/275.1 |
| 6,760,287 B2 | * | 7/2004 | Sato | 369/47.53 |
| 2001/0004344 A1 | * | 6/2001 | Roh | 369/53.22 |
| 2002/0085463 A1 | * | 7/2002 | Minemura et al. | 369/47.53 |
| 2003/0043711 A1 | * | 3/2003 | Mashimo et al. | 369/47.39 |
| 2003/0043714 A1 | * | 3/2003 | Takeda | 369/47.53 |
| 2004/0052186 A1 | * | 3/2004 | Yano et al. | 369/53.26 |
| 2004/0125720 A1 | * | 7/2004 | Ando et al. | 369/47.53 |

FOREIGN PATENT DOCUMENTS

JP 7057268 A 3/1995

* cited by examiner

Primary Examiner—W. R. Young
Assistant Examiner—Van Pham
(74) Attorney, Agent, or Firm—Christensen O'Connor Johnson Kindness PLLC

(57) ABSTRACT

The present invention provides an optical disk device which optimizes recording power level used when recording data. A controller records test data in a test region of an optical disk and evaluates reproduced signal quality of the test data, so as to determine an optimum recording power level Po (OPC). Subsequently, the controller uses reflected light intensity level B obtained when recording data to make adjustments to the optimum recording power level Po, thereby obtaining recording power level P. The recording power level P is adjusted such that $B^m/P^n$=constant, where m and n are positive rational numbers satisfying m<n. When m=1, the value of n is greater than or equal to 1.5 and no larger than 10.

17 Claims, 7 Drawing Sheets

|  | m | n |
|---|---|---|
| MANUFACTURER A | 1 | 3.2 |
| MANUFACTURER B | 1 | 2.5 |
| MANUFACTURER C | 1 | 3.0 |

Fig. 5

|  | m | n |
|---|---|---|
| INNER PORTION | 1 | 1.0 |
| INTERMEDIATE PORTION | 1 | 2.0 |
| OUTER PORTION | 1 | 3.2 |

Fig. 6

|  | m | n |
|---|---|---|
| ×10 | 1 | 3.2 |
| ×20 | 1 | 3.0 |
| ×24 | 1 | 1 |

OPTICAL DISK DEVICE

BACKGROUND OF THE INVENTION

1. Field of the Invention

The present invention relates to an optical disk device, and more particularly to optimization of power level for recording data.

2. Description of the Related Art

In an optical disk device such as a CD-R/RW drive and a DVD/R drive which allows recording of data, Optimum Power Control (OPC) and Running Optimum Power Control (ROPC) techniques are employed to optimize recording power level when recording data. OPC refers to a process in which test data are recorded (test-writing) on a predetermined area (PCA area) of an optical disk, and reproduced so as to determine a recording power level at which a value indicating reproduced signal quality, such as the $\beta$ value, achieves a target value. ROPC refers to feedback control performed with respect to the recording power level such that the intensity of reflected light from the optical disk during recording of data is maintained at a constant level. This control is executed to overcome variations in recording sensitivity resulting from unevenness in application of the recording film on the surface of the optical disk, changes in laser beam shape due to a tilt of the optical disk, and offsets in tracking and focus.

FIG. 8 shows a change in the intensity of reflected light from the optical disk when a laser beam having a recording power is irradiated thereon. Immediately after the beginning of irradiation of the laser beam at the recording power level, the pit is not yet being formed, and the reflected light intensity is therefore high. However, after a while when the pit is formed, diffraction by the formed pit reduces the reflected light intensity to a constant level. This level is the reflected light intensity level (voltage level B) used in ROPC. In ROPC, adjustments are made such that the voltage level B of reflected light intensity, which is normalized with the recording power level, is maintained at a constant level. In actual processing, the following relationship is considered to hold true (refer to FIG. 9):

$$Bo/Po = B/P = \text{constant} \quad (1)$$

where Po denotes the optimized recording power level obtained through OPC, Bo denotes the level B value of reflected light intensity obtained when Po is used, P denotes a recording power level at a given position on the disk, and B denotes the level B value of reflected light intensity obtained when P is used. Based on the above relationship, the following equation is obtained:

$$P = B/Bo \cdot Po \quad (2)$$

In accordance with this equation, the recording power P is adjusted by referring to the level B value of reflected light intensity.

Although the recording power P is thus conventionally adjusted under the assumption that the $\beta$ value can be maintained at a constant value by employing the relationship B/P=constant, there frequently exist cases where such adjustment cannot actually maintain a constant $\beta$ value over all regions of an optical disk, failing to achieve stable recording quality.

FIG. 10 shows an example of change in the $\beta$ value generated when data is recorded while adjusting the recording power in accordance with the above equation (2). While the target $\beta$ value $\beta o$ can be attained at the inner portions of the disk proximate to the PCA area, the $\beta$ value exceeds the target value $\beta o$ at the disk outer peripheral portions, because of excessive adjustment (compensation) of the recording power. This indicates that the assumption B/P=constant does not always hold true, and that adjustment of recording power should be performed in accordance with some other appropriate relationship.

SUMMARY OF THE INVENTION

The present invention provides an optical disk device which can record data on an optical disk at a high recording quality by adjusting the recording power level to an optimum value.

An optical disk device according to the present invention comprises means for recording test data in a predetermined region of an optical disk using a plurality of recording power levels, means for setting an optimum recording power level Po based on reproduced signal quality of the test data, means for adjusting, when recording data in a data region of the optical disk, the optimum recording power level Po in accordance with an intensity level B of reflected light from the optical disk. The means for adjusting adjusts the optimum recording power level Po such that a recording power P used when recording the data satisfies the following equation:

$$B^m/P^n = Bo^m/Po^n = \text{constant} \quad (3)$$

where m and n are positive rational numbers satisfying m<n, and Bo denotes a standard reflected light intensity level obtained when using the optimum recording power level Po.

Instead of adjusting the recording power P according to the relationship B/P=constant, the present invention adjusts the recording power P according to the relationship $B^m/P^n$=constant. Further, as the recording power P becomes excessively large when (m,n)=(1,1), adjustment of the recording power P is made by satisfying m<n, thereby accomplishing high-quality data recording.

In one embodiment of the present invention, m=1 and $1.5 \leq n \leq 10$ are true. In another embodiment of the present invention, m=1 while n is set at a value of approximately 3.

In a further embodiment of the present invention, adjustment of the recording power is executed by employing an equation approximate to the above equation. When m=1, the above equation can be approximated by the following equation:

$$P = \{1 + (1/n) \cdot (\Delta B/Bo)\} Po \quad (4)$$

where $\Delta B = B - Bo$. Using this equation, the recording power P used for data recording can be calculated when Po, Bo, B, and n are given.

The present invention will be understood more clearly by referring to the embodiments described below. However, the scope of the present invention is not limited to the following embodiments.

BRIEF DESCRIPTION OF THE DRAWINGS

FIG. 5 is a table explaining parameters (m,n) stored in the memory of FIG. 2 for each type of optical disk.

FIG. 6 is a table explaining parameters (m,n) stored in the memory of FIG. 2 for each data recording position.

FIG. 7 is a table explaining parameters (m,n) stored in the memory of FIG. 2 for each data recording speed.

PREFERRED EMBODIMENT OF THE INVENTION

Figure 1:
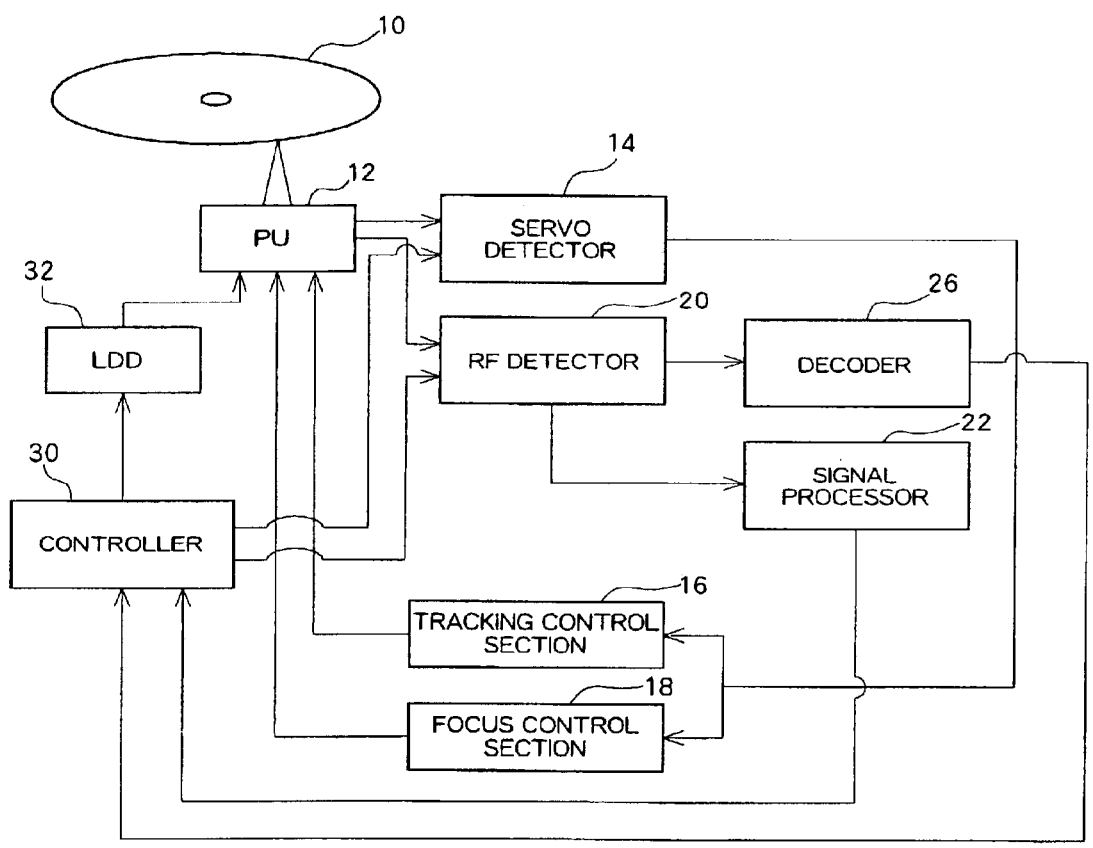
FIG. 1 is a block diagram showing a configuration of an optical disk device.

An embodiment according to the present invention is next described by referring to the drawings.

FIG. 1 is a block diagram showing a configuration of an optical disk device according to an embodiment of the present invention. A recordable optical disk 10, which may be a CD-R/RW or DVD-R/RW, is driven in rotation by a spindle motor.

A pickup (PU) 12 is provided opposing the optical disk 10. The pickup 12 includes a laser diode (LD) which irradiates a laser beam on the surface of the optical disk 10. The laser diode is driven by a laser diode driving circuit (LDD) 32 to irradiate a laser beam at a reproducing power level when reproducing data, and a laser beam at a recording power level when recording data (reproducing power level < recording power level). The pickup 12 further includes a photodetector which converts the reflected laser light from the optical disk 10 into an electrical signal. The reproduced signal is supplied to a servo detector 14 and an RF detector 20.

Based on the signal from the pickup 12, the servo detector 14 generates a tracking error signal and a focus error signal for supplying to a tracking control section 16 and a focus control section 18, respectively. The tracking control section 16 drives the pickup 12 in the track width direction of the optical disk 10 in accordance with the tracking error signal, so as to maintain the on-track state. Further, the focus control section 18 drives the pickup 12 in the focus direction in accordance with the focus error signal so as to maintain the on-focus state. In a four-segment photodetector, for example, a tracking error signal is generated based on a difference between signals obtained from the detector segments divided in the radial direction, while a focus error signal is generated based on a difference between the diagonal sums of the four-segment detector. It is noted that other methods for generating those signals may also be used.

The RF detector 20 generates a reproduced RF signal by amplifying the signal from the pickup 12, and supplies the reproduced signal to a signal processor 22 and a decoder 26. When executing OPC, the signal processor 22 detects, in the reproduced signal of the test data, signal components required for calculating the β value. The signal processor 22 then supplies the detected components to a controller 30. The β value is defined according to the following equation:

$$\beta=(|A1|-|A2|)/(|A1|+|A2|) \quad (5)$$

where A1 denotes the peak value of the reproduced RF signal subjected to AC coupling, and A2 denotes the bottom value. The signal processor 22 detects the peak and bottom values for each recording power level used during execution of OPC, and outputs those values to the controller 30.

Figure 8:
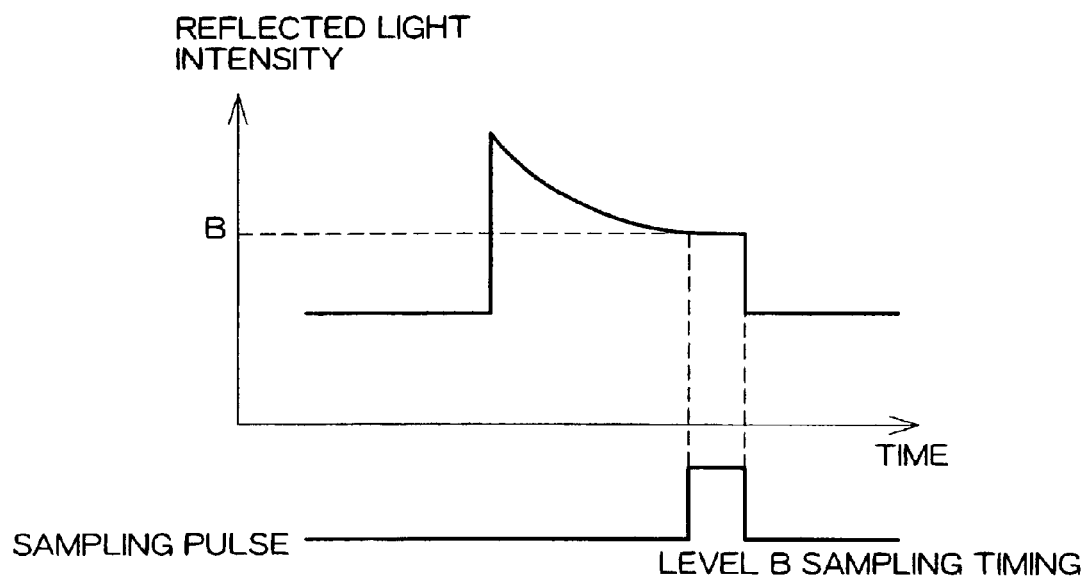
FIG. 8 is a diagram explaining a change in reflected light intensity over time and a sampling timing.
Figure 9:
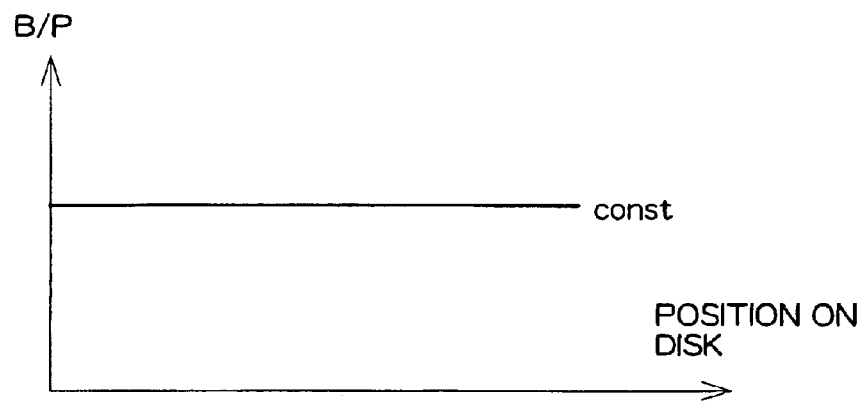
FIG. 9 is a graph illustrating a relationship between position on a disk and B/P.
Figure 10:
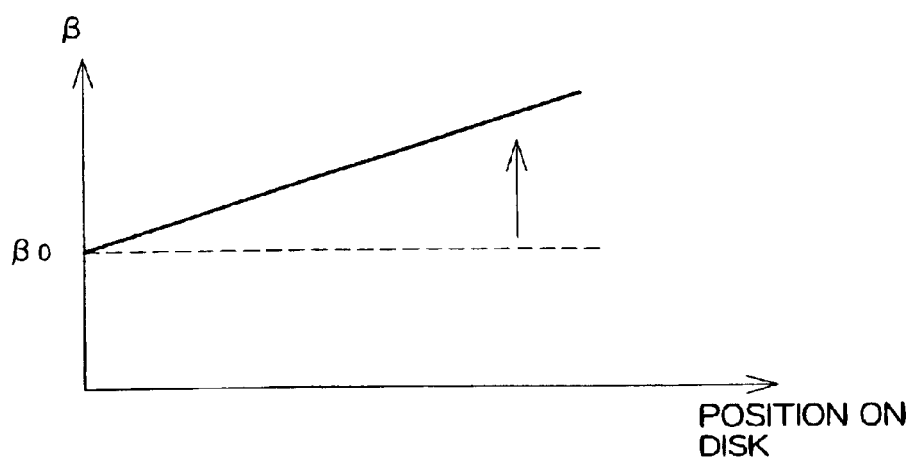
FIG. 10 is a graph illustrating a relationship between position on a disk and β value.

When executing ROPC, the signal processor 22 samples the reflection signal of recording power at a predetermined timing so as to determine the level B value, and outputs the determined value to the controller 30. The sampling timing is identical to that used in a conventional ROPC process (refer to FIG. 8). The level B value is determined by excluding a circuitry offset value. More specifically, the offset value is the level B value obtained when no laser beam is irradiated. During actual recording, the level B value after subtracting this offset value is output to the controller 30.

The decoder 26 comprises components such as an equalizer and a binarizer. The reproduced RF signal is binarized by boosting a predetermined frequency, or more specifically, the amplitude of the 3T signal, of the reproduced RF signal. The binarized signal is then decoded and output to the controller 30. The decoding is executed by generating a synchronizing clock signal in a PLL circuit and using the clock signal to extract appropriate signal components.

The controller 30 controls operation of each of the components such as the servo detector 14, RF detector 20, and LDD 32, and outputs the decoded data received from the decoder 26 to a higher-order device such as a personal computer.

When recording data, the controller 30 drives the LDD 32 in accordance with recording data supplied from the higher-order device, so as to record the data using a set recording strategy. A recording strategy may specify that, when recording data of lengths 3T–14T (T denotes a standard period of length in the track direction) in a DVD-R, 3T data is recorded using a single pulse, while data of 4T or longer is recorded using a multi-pulse signal comprising a leading pulse (top pulse) having a given pulse width and amplitude and subsequent pulses having given pulse widths and amplitudes. Prior to actual data recording, the controller 30 conducts OPC. More specifically, the controller 30 drives the LDD 32 to record test data for several frames in the PCA area of the optical disk 10 using various recording power levels. The test data are then reproduced, and the signal processor 22 detects the peak and bottom values. Based on those values supplied by the signal processor 22, the controller 30 calculates β values for the respective recording power levels. The obtained β values are compared with the target value βo to determine a recording power level which attains the target value βo, namely, the optimum recording power level Po. When conducting the actual recording of data supplied from the higher-order device in the data area of the optical disk 10, the controller 30 further executes ROPC to perform a feedback control with respect to the optimum recording power level Po. More specifically, the controller 30 monitors the level B value supplied from the signal processor 22, and makes increasing or reducing adjustments to the optimum recording power level Po based on the level B value, such that the β value can be maintained at a constant value.

Figure 2:
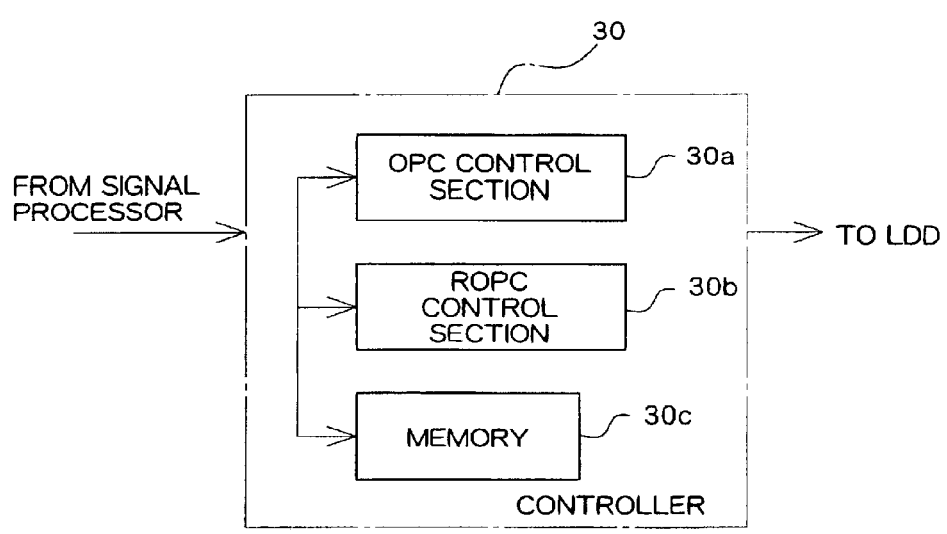
FIG. 2 is a diagram showing functional blocks of the controller of FIG. 1.

FIG. 2 shows functional blocks of the controller 30 of FIG. 1. The controller 30 comprises an OPC control section 30a and an ROPC control section 30b for executing OPC and ROPC, respectively. The controller 30 further includes a memory 30c for storing various parameters. The controller 30 is constituted by a microprocessor. The OPC control section 30a and the ROPC control section 30b are configured by a CPU of the microprocessor, while the memory 30c is configured with ROM and RAM.

The OPC control section 30a calculates β values according to the equation (5) using the peak and bottom values supplied from the signal processor 22, and, based on the calculated β values, determines by linear approximation a recording power level which attains the target value βo. The determined optimum recording power level Po and the level B value of reflected light obtained when test data is recorded using this recording power level Po, namely, the standard B value Bo, are stored in the memory 30c.

The ROPC control section 30b adjusts recording power level P using level B values supplied from the signal processor 22, the optimum recording power level Po, and parameters m and n (m and n are positive rational numbers) stored in advance in the memory 30c. More specifically, the ROPC control section 30b sets the recording power level P such that the following equation holds true:

$$Bo^m/Po^n = B^m/P^n = \text{constant} \quad (6)$$

As described above, a combination of (m,n)=(1,1), which cannot frequently maintain β at a constant value over all regions of the disk, is typically employed in conventional devices. Through various studies over combinations of (m,n) (where m<n), the inventor of the present invention discovered that (m,n)=(1, 1.5–10) is preferable, and particularly (m,n)=(1, 3.2) allows the β value to be maintained at a substantially constant value.

Figure 3:
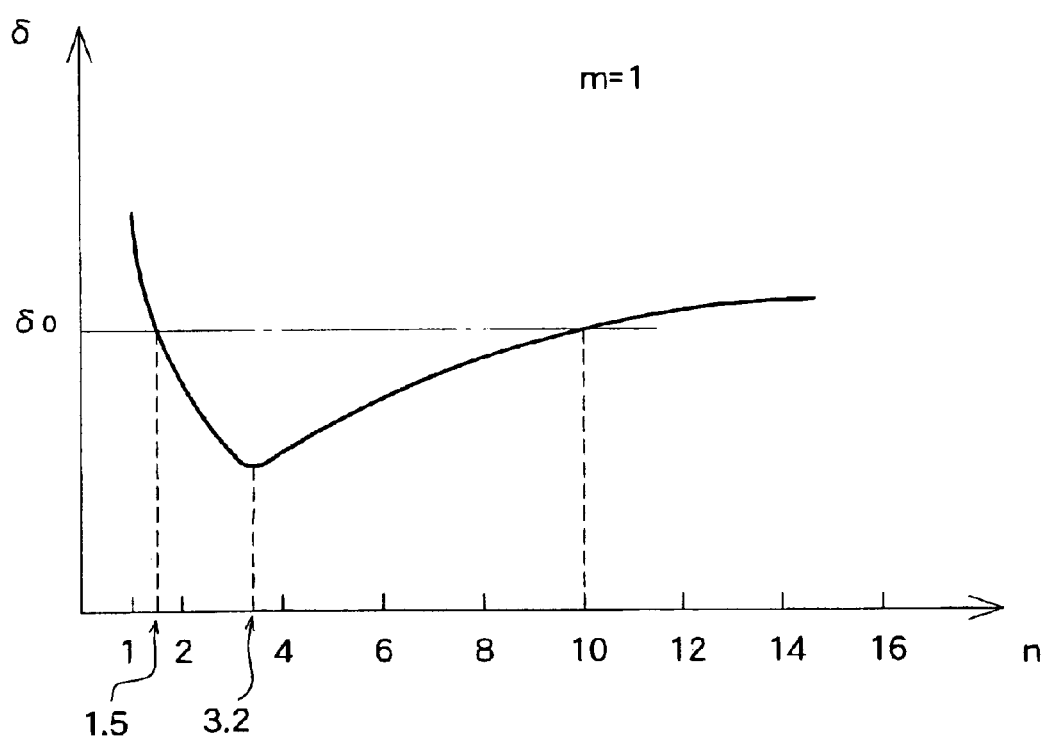
FIG. 3 is a graph illustrating a relationship between parameter n and difference value $\delta$ when parameter m=1.

FIG. 3 indicates difference value δ between the β values at an inner portion and an outer portion of the disk (δ=|β value at a disk inner portion −β value at a disk outer portion|) obtained when m=1 and n is varied. The difference value at n=1 in the figure is the typical difference value in conventional devices. The graph shows that difference value δ smaller than the target difference value δo can be achieved when n=1.5–10. Particularly when n is approximately 3, and more specifically when n is approximately 3.2, minimum difference value δ can be accomplished. The difference value δ increases in both cases when n is smaller than 1.5 or larger than 10, resulting in unstable recording quality.

Accordingly, the ROPC control section 30b reads out the parameters (m,n)=(1, 3.2) from the memory 30c, and generates a recording power level P used for data recording by making adjustments to the optimum recording power level Po such that the following equation holds true:

$$Bo/Po^{3.2} = B/P^{3.2} = \text{constant} \quad (7)$$

The above equation (7) can be approximated as below:

$$\begin{aligned} P &= (B/Bo)^{1/n} \cdot Po \\ &= (1 + \Delta B/Bo)^{1/n} \cdot Po \\ &= (1 + 1/n \cdot \Delta B/Bo) \cdot Po \end{aligned} \quad (8)$$

where n=3.2 and ΔB=B−Bo. The ROPC control section 30b calculates the recording power level P based on the B value input from the signal processor 22. As can be understood from the equation (8), the recording power level P can be obtained using the detected B value via a one-step computation. An appropriate β value can thus be attained immediately after the start of recording without requiring a plurality of recording steps.

Figure 4:
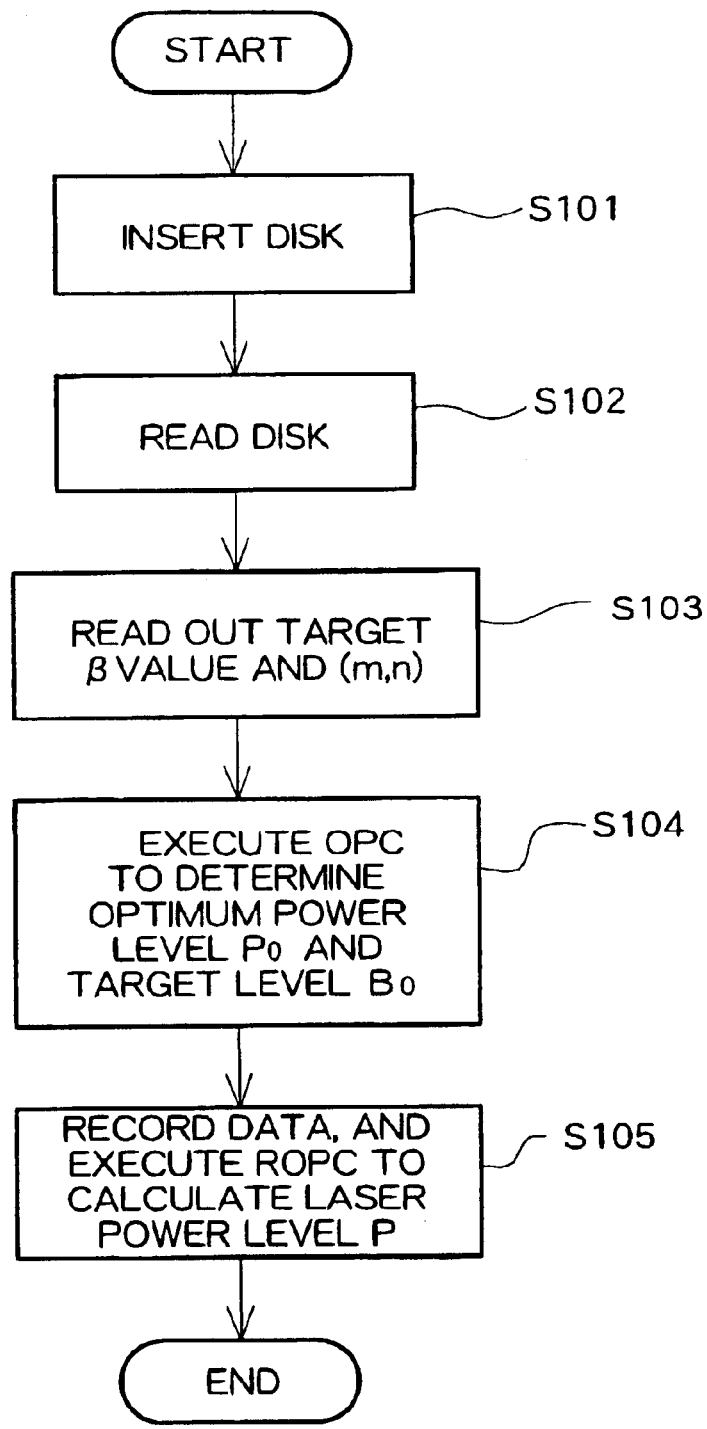
FIG. 4 is a flowchart showing processing according to an embodiment of the present invention.

FIG. 4 is a flowchart showing processing of the controller 30 according to the present embodiment. First, when an optical disk is inserted (S101), the controller 30 reads an ID pre-recorded on the optical disk to identify information concerning the disk such as the manufacturer and the type (S102). Subsequently, in accordance with the read-out ID, the controller 30 reads out from the memory 30c a target value βo and parameters (m,n), and sets those values (S103). The parameters (m,n) maybe fixed at (1, 3.2), or alternatively, different βo values and combinations of (m,n) may be stored in the memory 30c in correlation with respective varieties of optical disks 10. For example, (m,n)= (1, 3.2) may be set for an optical disk 10 produced by manufacturer A while (m,n)=(1, 2.5) may be set for an optical disk 10 produced by manufacturer B. The present applicant has confirmed that successful results can be obtained for most optical disks 10 when (m,n)=(1, 1.5–10).

After setting the target value βo and the parameters (m,n) as described above, the controller 30 executes OPC to determine the optimum power level Po and the standard value of reflected light intensity Bo (the target level for ROPC) (S104).

Data is then recorded in the data area of the disk using the optimum power level Po, and, at that time, ROPC is executed to make increasing or reducing adjustments to the recording power level P using the equation (8) and in accordance with the level B value (S105).

In this manner, the β value can be maintained at a substantially constant value regardless of the recording position on the disk, thereby suppressing the jitter value, CI error, and the like. Disk reproduction compatibility can also be ensured.

While the present invention was explained above in relation to a preferred embodiment, the present invention is not limited to the embodiment and may include various changes.

For example, while the recording power level P is adjusted during ROPC using (m,n)=(1, 3.2) in the present embodiment, the combination of (m,n) can be appropriately dynamically adjusted in accordance with the recording conditions. More specifically, with respect to a given optical disk 10, the recording power level P maybe adjusted initially using (m,n)=(1, 3.2), then later changing the parameters to (m,n)=(1, 1.5). When a particularly large sensitivity difference exists in the surface of an optical disk 10, the combination of (m,n) may be altered in a stepwise manner along the radial direction. For example, the combination of (m,n)= (1, 1) may be employed for the innermost portion close to the center, (m,n)=(1, 2) for the intermediate portion, and (m,n)=(1, 3.2) for the outer peripheral portion. The device may determine an optimum n value through learning by first recording data using a given n, calculating β after the data recording, and determining an optimum n value based on the relationship among the recording power P, β, and the level B value.

In the present embodiment, combinations of (m,n) satisfying m<n where m does not equal 1 may also be employed. For example, (m,n)=(2, 3) may be possible.

In an optical disk device which can conduct recording at a plurality of recording speeds, the optimum recording power level and the level B value of reflected light intensity differ for each recording speed (each linear velocity). Accordingly, in such a device, (m,n) pairs are preferably predetermined for the respective recording speeds. For example, (m,n)=(1, 3.2) may be set for 10-speed recording, while (m,n)=(1, 3.0) may be set for 20-speed recording.

In a rewritable optical disk, sensitivity of the recording film changes according to the number of rewrites performed. Accordingly, in a rewritable optical disk device, the number of rewrites performed on an optical disk 10 may be determined in some way, and the combination of (m,n) can be varied in accordance with the determined number of rewrites.

FIGS. 5, 6, and 7 show parameters m and n stored in the memory 30c of the controller 30. FIG. 5 shows the parameters (m,n) provided corresponding to each of three different manufacturers A, B, and C of optical disks 10. FIG. 6 indicates the parameters (m,n) provided corresponding to different data recording positions on an optical disk 10, namely, the inner portion, intermediate portion, and outer portion. A data recording position may be defined by a radial location or an address. The value of n is increased as the data recording position is located further towards the outer periphery, so as to avoid excessive compensation of recording power. The parameters according to FIG. 6 prevent inappropriate recording power compensation that may excessively increase the recording power. FIG. 7 shows the parameters (m,n) provided corresponding to each of different recording speeds, namely, 10-speed, 20-speed, and 24-speed. The value of n is reduced as the data recording speed is increased. When the recording speed is higher, recording is basically less easily executed, consequently requiring a higher recording power level. By reducing the value of n with an increase in speed according to FIG. 7, recording power can be sufficiently compensated. In the present embodiment, the recording power P used for data recording is adjusted in accordance with the equation (8), which is an approximate equation of the equations (6) and (7). It should be apparent from those equations that the recording power P is reduced when the value of parameter n is increased.

The memory 30c, which stores the parameters m and n, can be provided separately from the controller 30. Further, standard values of the parameters m and n may be stored in the memory 30c, such that the controller 30 can use those standard values by compensating the values according to a corresponding manufacturer of the optical disk, data recording position, or data recording speed.

What is claimed is:

1. An optical disk device, comprising:

means for recording test data in a predetermined region of an optical disk using a plurality of recording power levels;

means for setting an optimum recording power level Po based on reproduced signal quality of the test data; and means for adjusting the optimum recording power level Po in accordance with an intensity level B of reflected light from the optical disk, when recording data in a data region of the optical disk; wherein said means for adjusting adjusts the optimum recording power level Po such that a recording power P used when recording the data satisfies the following equation:

$$B^m/P^n = Bo^m/Po^n = \text{constant}$$

where m and n are positive rational numbers satisfying m<n, and Bo denotes a standard reflected light intensity level obtained when using the optimum recording power level Po.

2. A device as defined in claim 1, wherein said m equals 1, and said n is greater than or equal to 1.5 and no larger than 10.

3. A device as defined in claim 1, wherein said m equals 1, and said n is approximately 3.

4. A device as defined in claim 1, wherein said m equals 1, and said n is approximately 3.2.

5. A device as defined in claim 1, wherein said m equals 1; and said means for adjusting adjusts the optimum recording power level Po such that the recording power P used when recording the data satisfies the following equation:

$$P = \{1 + (1/n) \cdot (\Delta B/Bo)\}Po$$

where $\Delta B = B - Bo$.

6. A device as defined in claim 1, further comprising:

means for distinguishing a type of the optical disk; and means for setting a pair of said m and n in accordance with the type of the optical disk.

7. A device as defined in claim 1, further comprising means for setting a pair of said m and n in accordance with a data recording position on the optical disk.

8. A device as defined in claim 7, wherein said means for setting further increases the value of n when the data recording position is in an outer portion of the optical disk compared to when the data recording position is in an inner portion.

9. A device as defined in claim 1, further comprising means for setting a pair of m and n in accordance with a data recording speed of the optical disk.

10. A device as defined in claim 9, wherein said means for setting reduces the value of n as the recording speed is increased.

11. An optical disk device, comprising:

a laser diode which records data by irradiating on an optical disk a laser beam having a recording power;

a photodetector which receives a reflected light from the optical disk and outputs a reflection signal in accordance with the reflected light intensity;

a controller which adjusts the recording power by, during execution of OPC, recording test data while varying the recording power level to determine an optimum recording power level, and, during execution of ROPC, adjusting the optimum recording power level in accordance with the reflected light intensity from the optical disk; and a memory which stores parameters m and n, where m and n are positive rational numbers satisfying m<n; wherein said controller reads out the parameters m and n stored in said memory and adjusts the optimum recording power level such that the following equation holds true:

$$B^m/P^n = Bo^m/Po^n = \text{constant}$$

where P denotes a recording power level after adjustment, Po denotes the optimum recording power level, Bo denotes a standard reflected light intensity level obtained when using the optimum recording power level Po during execution of OPC, and B denotes a reflected light intensity level during execution of ROPC.

12. A device as defined in claim 11, wherein said m equals 1; and said controller adjusts the optimum recording power level such that the following equation holds true:

$$P = \{1 + (1/n) \cdot (\Delta B/Bo)\}Po$$

where $\Delta B = B - Bo$.

13. A device as defined in claim 12, wherein said n is approximately 3.

14. A device as defined in claim 12, wherein said n is approximately 3.2.

15. A device as defined in claim 11, wherein said memory stores the parameters m and n in correlation with respective manufacturers of optical disks, and said controller reads out from said memory the parameters m and n correlated to a corresponding manufacturer of the optical disk.

16. A device as defined in claim 11, wherein said memory stores the parameters m and n in correlation to respective data recording positions on the optical disk, and said controller reads out from said memory the parameters m and n correlated to a corresponding data recording position on the optical disk.

17. A device as defined in claim 11, wherein said memory stores the parameters m and n in correlation to respective data recording speeds of the optical disk, and said controller reads out from said memory the parameters m and n correlated to a corresponding data recording speed of the optical disk.

* * * * *